(12) United States Patent
Murakami et al.

(10) Patent No.: US 8,964,957 B2
(45) Date of Patent: Feb. 24, 2015

(54) TELEPHONE, CONTROL METHOD THEREFOR, PROVISIONING SERVER, AND CONTROL METHOD THEREFOR

(75) Inventors: Shingo Murakami, Kanagawa (JP); Toshikane Oda, Tokyo (JP); Shinta Sugimoto, Kanagawa (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 31 days.

(21) Appl. No.: 13/812,662

(22) PCT Filed: Aug. 4, 2010

(86) PCT No.: PCT/JP2010/063590
§ 371 (c)(1),
(2), (4) Date: Jan. 28, 2013

(87) PCT Pub. No.: WO2012/017562
PCT Pub. Date: Feb. 9, 2012

(65) Prior Publication Data
US 2013/0121483 A1    May 16, 2013

(51) Int. Cl.
*H04M 3/42* (2006.01)
*H04M 3/54* (2006.01)
(Continued)

(52) U.S. Cl.
CPC ............ *H04M 3/54* (2013.01); *H04M 1/72519* (2013.01); *H04M 3/548* (2013.01);
(Continued)

(58) Field of Classification Search
CPC .............. H04M 3/42102; H04M 3/42229; H04M 3/438; H04M 3/54; H04M 3/541; H04M 3/543; H04M 3/58; H04M 2250/14; H04B 1/005; H04B 1/006; H04B 1/3816; H04W 76/02; H04W 76/021; H04W 76/025; H04W 88/06; H04W 4/003; H04W 4/16; H04W 8/183; H04W 8/265; H04W 12/06

USPC ............ 379/211.01, 211.02, 212.01, 220.01, 379/221.01, 221.14, 273; 455/426.1, 445, 455/552.1, 553.1, 558
See application file for complete search history.

(56) References Cited

U.S. PATENT DOCUMENTS

| 2008/0064443 A1* | 3/2008 | Shin et al. ...................... 455/558 |
| 2009/0156222 A1* | 6/2009 | Bender ........................ 455/445 |
| 2012/0204231 A1* | 8/2012 | Holtmanns et al. ............... 726/3 |

FOREIGN PATENT DOCUMENTS

| JP | 5-328429 A | 12/1993 |
| JP | 2006-121334 A | 5/2006 |
| JP | 2008-236346 A | 10/2008 |

OTHER PUBLICATIONS

International Search Report, PCT/JP2010/063590, Sep. 21, 2010.
(Continued)

*Primary Examiner* — Antim Shah
(74) *Attorney, Agent, or Firm* — Myers Bigel Sibley & Sajovec, P.A.

(57) ABSTRACT

There is provided a telephone that is capable of accessing a memory for storing subscription information that includes a phone number. The telephone comprises, among other things: a searching unit that searches the memory for second subscription information that is different from the first subscription information selected by the selecting unit; an obtaining unit that obtains a first phone number included in the first subscription information and transfer source information that enables a call transfer server of a network operator associated with the second subscription information to identify a second phone number included in the second subscription information; and a sending unit that sends, to the call transfer server, a call transfer request for requesting the network operator to transfer a call addressed to a phone number, which is identified by the call transfer server based on the transfer source information, to the first phone number.

5 Claims, 9 Drawing Sheets

(51) Int. Cl.
*H04M 1/725* (2006.01)
*H04W 4/16* (2009.01)
*H04W 8/18* (2009.01)
*H04W 88/06* (2009.01)

(52) U.S. Cl.
CPC ............... *H04W 4/16* (2013.01); *H04W 8/183* (2013.01); *H04W 88/06* (2013.01)
USPC ................................ 379/212.01; 379/211.02

(56) References Cited

OTHER PUBLICATIONS

Written Opinion of the International Searching Authority, PCT/JP2010/063590, Sep. 21, 2010.
International Preliminary Report on Patentability, PCT/JP2010/063590, Jul. 11, 2012.
3GPP TS 33.223 V8.5.0 (Sep. 2009) Technical Specification, 3rd Generation Partnership Project; Technical Specification Group Services and System Aspects; Generic Authentication Architecture (GAA); Generic Bootstrapping Architecture (GBA) Push function (Release 8), Sep. 2009, 23 pp.

* cited by examiner

TELEPHONE, CONTROL METHOD THEREFOR, PROVISIONING SERVER, AND CONTROL METHOD THEREFOR

CROSS REFERENCE TO RELATED APPLICATION

This application is a 35 U.S.C. §371 national stage application of PCT International Application No. PCT/JP2010/063590, filed on 4 Aug. 2010, the disclosure and content of which is incorporated by reference herein in its entirety. The above-referenced PCT International Application was published in the English language as International Publication No. WO 2012/017562 A1 on 9 Feb. 2012.

TECHNICAL FIELD

The present invention generally relates to a telephone, a control method therefor, a provisioning server, and a control method therefor.

BACKGROUND

The 3rd Generation Partnership Project (3GPP) discusses remote provisioning of subscription for Machine-to-Machine equipment (M2ME) (see 3GPP TR 33.812 V9.0.0). According to TR 33.812, M2ME, which is a kind of a communication device, is provided with a temporary private identity called a Provisional Connectivity ID (PCID). The PCID follows the same format as an International Mobile Subscriber Identity (IMSI), and a network operator identified by the PCID is called a Registration Operator (RO). The M2ME accesses the RO using the PCID, and requests for subscription information called a Machine Communication Identity Module (MCIM). Upon request, the RO accesses another network operator called a Selected Home Operator (SHO), receives the MCIM issued by the SHO, and forwards the MCIM to the M2ME.

In this way, the M2ME is able to obtain the MCIM from the SHO via the RO using the PCID just one time, and thereafter, the M2ME is able to attach a 3GPP network using the MCIM.

The mechanism of TR 33.812 is convenient for a user of a communication device such as a mobile phone in that it is possible for the user to obtain subscription information for the communication device via a network.

Through the mechanism of TR 33.812, a user of a mobile phone can easily obtain an MCIM, which equates to a Universal Subscriber Identity Module (USIM) in this context, and provision it into the mobile phone as needed. Accordingly, it will be more likely in the future that a single mobile phone is provided with two or more USIMs.

For example, assume the scenario where a user living in Sweden makes a trip to Japan. Initially, the mobile phone of the user is provided with a USIM ("USIM-S") of a Swedish network operator ("Operator-S"). After arriving in Japan, the user decides to subscribe to a Japanese network operator ("Operator-J"). The user provisions a USIM ("USIM-J") of Operator-J into the mobile phone, and causes the mobile phone to attach a 3GPP network using USIM-J. Because the user maintains the subscription to Operator-S, the mobile phone is provided with two USIMs.

However, while the user is using USIM-J, because attaching a 3GPP network using USIM-S cannot be performed, the user cannot receive a phone call addressed to the phone number of USIM-S. Although Operator-S may provide a call transfer service, in the conventional art, it is cumbersome for the user to subscribe to the call transfer service and correctly configure the service such that a phone call addressed to the phone number of USIM-S is transferred to the phone number of USIM-J.

Moreover, while the user is using USIM-J, the user cannot make a phone call using the phone number of USIM-S as a caller phone number.

SUMMARY

The present invention is intended to address the above-described problem, and it is a feature thereof to introduce an improved mechanism for configuring call transfer.

According to the first aspect of the present invention, there is provided a telephone that is capable of accessing a memory for storing subscription information that includes a phone number, the telephone comprising:

a selecting unit that selects one of items of subscription information stored in the memory as first subscription information for use in attaching a communication network;

a searching unit that searches the memory for second subscription information that is different from the first subscription information;

an obtaining unit that obtains a first phone number included in the first subscription information and transfer source information that enables a call transfer server of a network operator associated with the second subscription information to identify a second phone number included in the second subscription information; and a sending unit that sends, to the call transfer server, a call transfer request for requesting the network operator to transfer a call addressed to a phone number, which is identified by the call transfer server based on the transfer source information, to the first phone number.

According to the second aspect of the present invention, there is provided a method for controlling a telephone that is capable of accessing a memory for storing subscription information that includes a phone number, the method comprising:

a selecting step of selecting one of items of subscription information stored in the memory as first subscription information for use in attaching a communication network;

a searching step of searching the memory for second subscription information that is different from the first subscription information;

an obtaining step of obtaining a first phone number included in the first subscription information and transfer source information that enables a call transfer server of a network operator associated with the second subscription information to identify a second phone number included in the second subscription information; and a sending step of sending, to the call transfer server, a call transfer request for requesting the network operator to transfer a call addressed to a phone number, which is identified by the call transfer server based on the transfer source information, to the first phone number.

According to the third aspect of the present invention, there is provided a provisioning server for providing a telephone with subscription information that includes a phone number, the provisioning server comprising:

a storing unit that stores, in a memory, association information representing association between a device identifier that identifies the telephone, respective subscription identifiers that identify respective items of subscription information that have been provided to the telephone, and respective phone numbers included in the respective items of subscription information;

a request receiving unit that receives a call transfer request from the telephone, the call transfer request including the device identifier and a first subscription identifier that identifies first subscription information that has been selected by the telephone for use in attaching a communication network;

a searching unit that searches the memory for a second subscription identifier that is associated with the device identifier and that identifies second subscription information which is different from the first subscription information;

an obtaining unit that obtains a first phone number included in the first subscription information and a second phone number included in the second subscription information; and a request sending unit that sends, to a call transfer server of a network operator associated with the second subscription information, a call transfer request for requesting the network operator to transfer a call addressed to the second phone number to the first phone number.

According to the fourth aspect of the present invention, there is provided a method for controlling a provisioning server for providing a telephone with subscription information that includes a phone number, the method comprising:

a storing step of storing, in a memory, association information representing association between a device identifier that identifies the telephone, respective subscription identifiers that identify respective items of subscription information that have been provided to the telephone, and respective phone numbers included in the respective items of subscription information;

a request receiving step of receiving a call transfer request from the telephone, the call transfer request including the device identifier and a first subscription identifier that identifies first subscription information that has been selected by the telephone for use in attaching a communication network;

a searching step of searching the memory for a second subscription identifier that is associated with the device identifier and that identifies second subscription information which is different from the first subscription information;

an obtaining step of obtaining a first phone number included in the first subscription information and a second phone number included in the second subscription information; and a request sending step of sending, to a call transfer server of a network operator associated with the second subscription information, a call transfer request for requesting the network operator to transfer a call addressed to the second phone number to the first phone number.

According to the fifth aspect of the present invention, there is provided a telephone that is capable of accessing a memory for storing subscription information that is provided by a provisioning server and includes a phone number, the telephone comprising:

a selecting unit that selects one of items of subscription information stored in the memory as first subscription information for use in attaching a communication network;

a sending unit that sends a call transfer request to the provisioning server, the call transfer request including a device identifier that identifies the telephone and a first subscription identifier that identifies the first subscription information;

a receiving unit that receives a third phone number from the provisioning server as a response to the call transfer request;

an input unit that inputs a called phone number; and a calling unit that makes a call to the third phone number using the first phone number as a caller phone number in response to the input of the called phone number, wherein the calling unit further makes a call to the called phone number via a phone call established as a result of making the call to the third phone number.

According to the sixth aspect of the present invention, there is provided a method for controlling a telephone that is capable of accessing a memory for storing subscription information that is provided by a provisioning server and includes a phone number, the method comprising:

a selecting step of selecting one of items of subscription information stored in the memory as first subscription information for use in attaching a communication network;

a sending step of sending a call transfer request to the provisioning server, the call transfer request including a device identifier that identifies the telephone and a first subscription identifier that identifies the first subscription information;

a receiving step of receiving a third phone number from the provisioning server as a response to the call transfer request;

an input step of inputting a called phone number; and a calling step of making a call to the third phone number using the first phone number as a caller phone number in response to the input of the called phone number, wherein the calling step further makes a call to the called phone number via a phone call established as a result of making the call to the third phone number.

By virtue of the features of the present invention, an improved mechanism for configuring call transfer is introduced. Moreover, according to some aspects of the present invention, the user can make a phone call using the phone number of non-selected subscription information as a caller phone number with reduced labor.

Further features of the present invention will become apparent from the following description of exemplary embodiments with reference to the attached drawings, in which like reference characters designate the same or similar parts throughout the figures thereof.

DETAILED DESCRIPTION

In the following embodiments, a mobile phone is referred to as an example of the telephone of the present invention. However, the present invention is not limited to the mobile phone. The telephone of the present invention may be a fixed telephone.

(First Embodiment)

Figure 1:
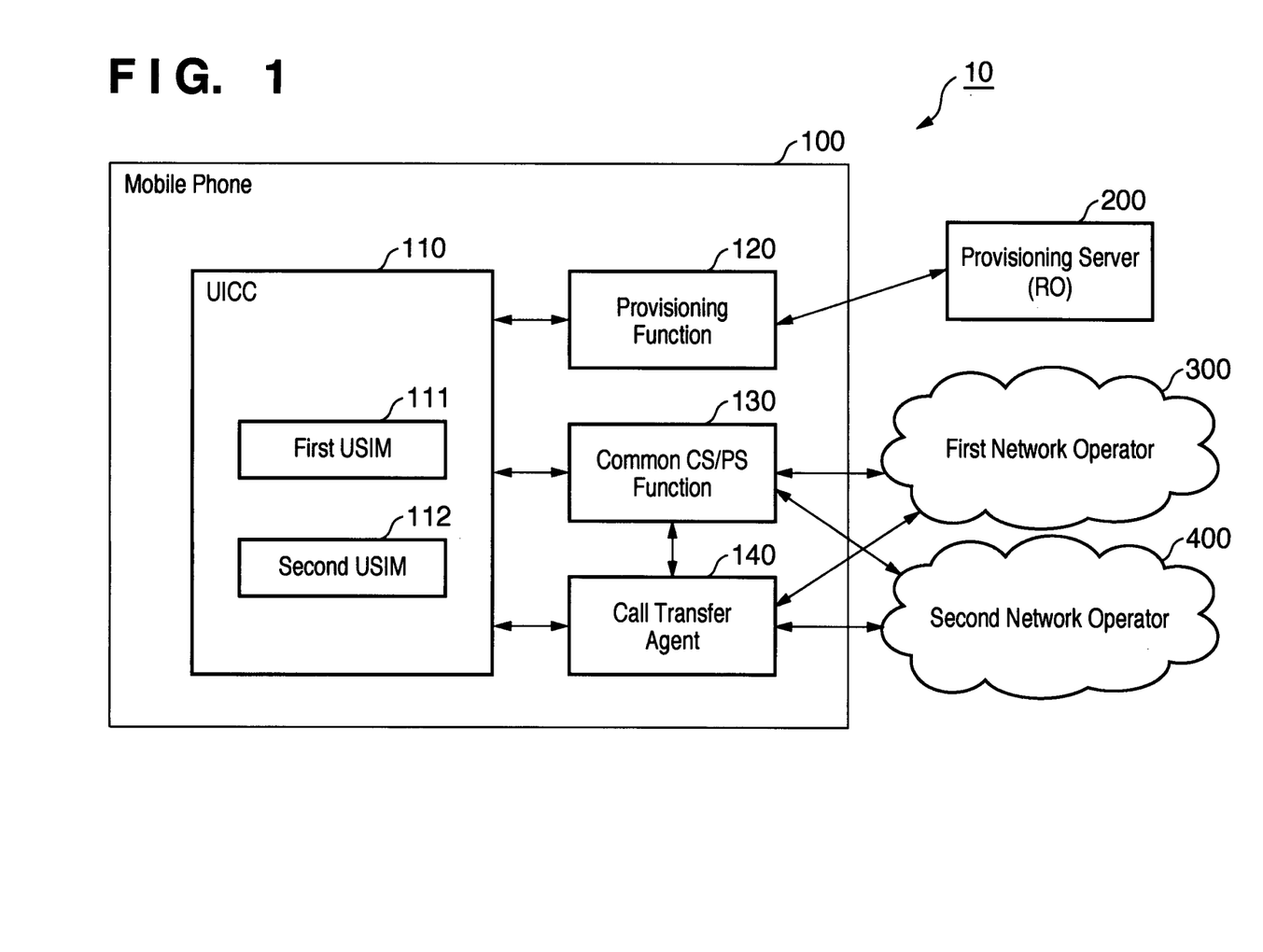
FIG. 1 illustrates an overview of a call transfer system 10 according to the first embodiment of the present invention.

FIG. 1 illustrates an overview of a call transfer system 10 according to the first embodiment of the present invention. The call transfer system 10 comprises a mobile phone 100, a provisioning server 200 that is operated by an RO, a first network operator 300, and a second network operator 400.

The mobile phone 100 comprises a Universal Integrated Circuit Card (UICC) 110, a provisioning function 120, a common CS/PS function 130, and a call transfer agent 140.

The provisioning function 120 obtains a USIM from the provisioning server 200 and stores the obtained USIM in the UICC 110 in accordance with the mechanism defined in 3GPP TR 33.812. In the present embodiment, it is assumed that the provisioning function 120 has stored a first USIM 111 of the first network operator 300 and a second USIM 112 of the second network operator 400 in the UICC 110. The first USIM 111 includes a Mobile Subscriber ISDN Number (MSISDN), which is hereinafter referred to as a "first phone number", and the second USIM 112 includes an MSISDN, which is hereinafter referred to as a "second phone number".

It should be noted that although it is assumed that the mobile phone 100 obtains USIMs in accordance with the mechanism of TR 33.812, the present embodiment is not limited to this mechanism. For example, the user may visit a network operator's shop and ask a clerk to provision a USIM in the UICC 110.

The common CS/PS function 130 performs operations related to Circuit Switched (CS) communication and Packet Switched (PS) communication through a 3GPP network. In particular, the common CS/PS function 130 selects one of the USIMs stored in the UICC 110, and attaches a 3GPP network using the selected USIM. For example, the common CS/PS function 130 selects the first USIM 111 and establishes an IP bearer to a Gateway GPRS Support Node (GGSN) of the first network operator 300.

It should be noted that the functionality of the provisioning function 120 and the common CS/PS function 130 may be implemented using dedicated hardware, using software executed by a processor (not shown) of the mobile phone 100, or a combination thereof.

The call transfer agent 140 performs the configuration procedure of call transfer as detailed later with reference to the sequence diagram of FIG. 3. The call transfer agent 140 also performs the second dialing procedure as detailed later with reference to the sequence diagram of FIG. 4.

Figure 2:
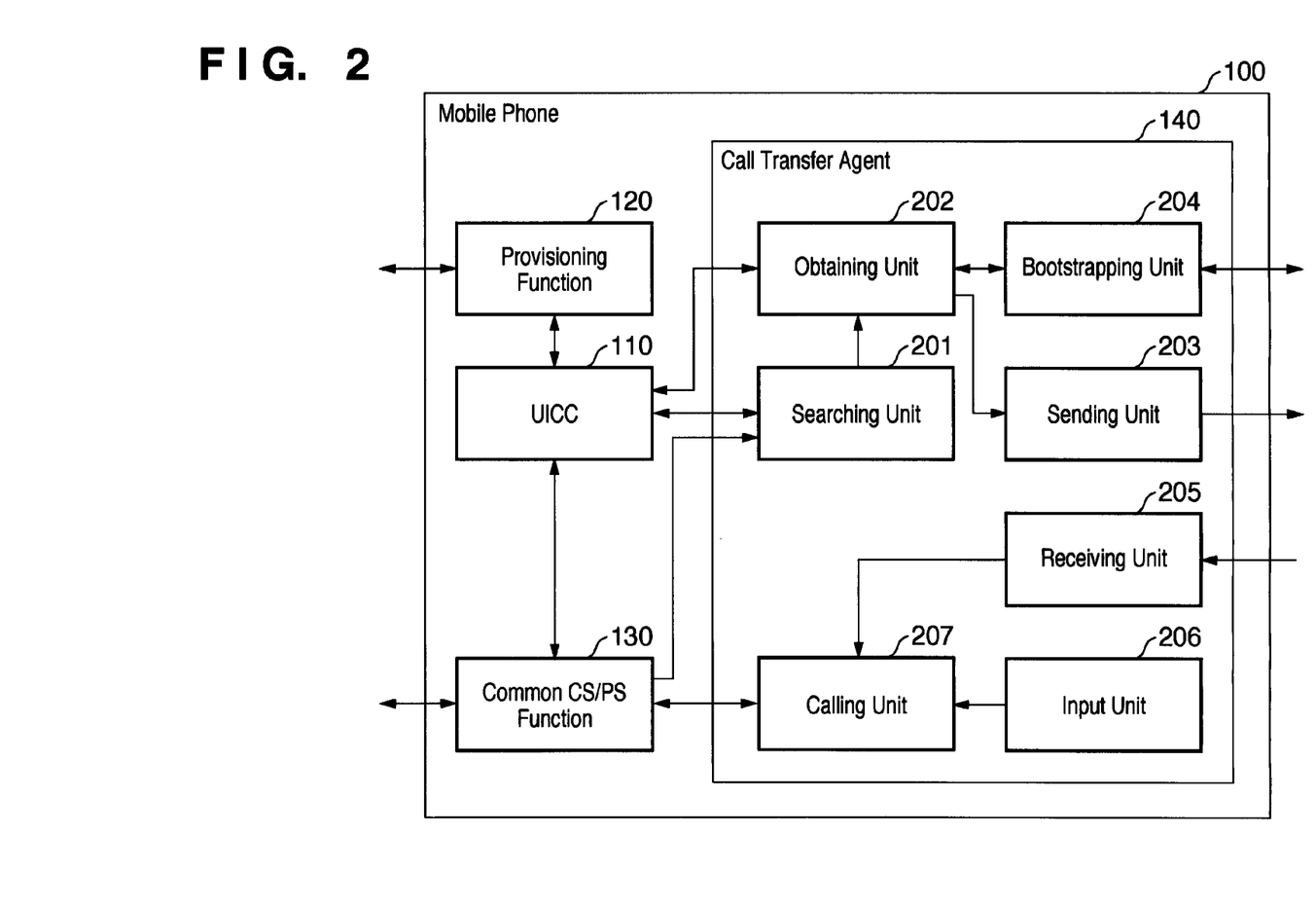
FIG. 2 illustrates a detailed configuration of the call transfer agent 140 of the mobile phone 100.

FIG. 2 illustrates a detailed configuration of the call transfer agent 140 of the mobile phone 100. The call transfer agent 140 comprises a searching unit 201, an obtaining unit 202, a sending unit 203, a bootstrapping unit 204, a receiving unit 205, an input unit 206, and a calling unit 207. It should be noted that the functionality of each block in the call transfer agent 140 may be implemented using dedicated hardware, using software executed by a processor (not shown), or a combination thereof. The detailed operations of each block in the call transfer agent 140 will be described later with reference to the sequence diagrams of FIGS. 3 and 4.

Figure 3:
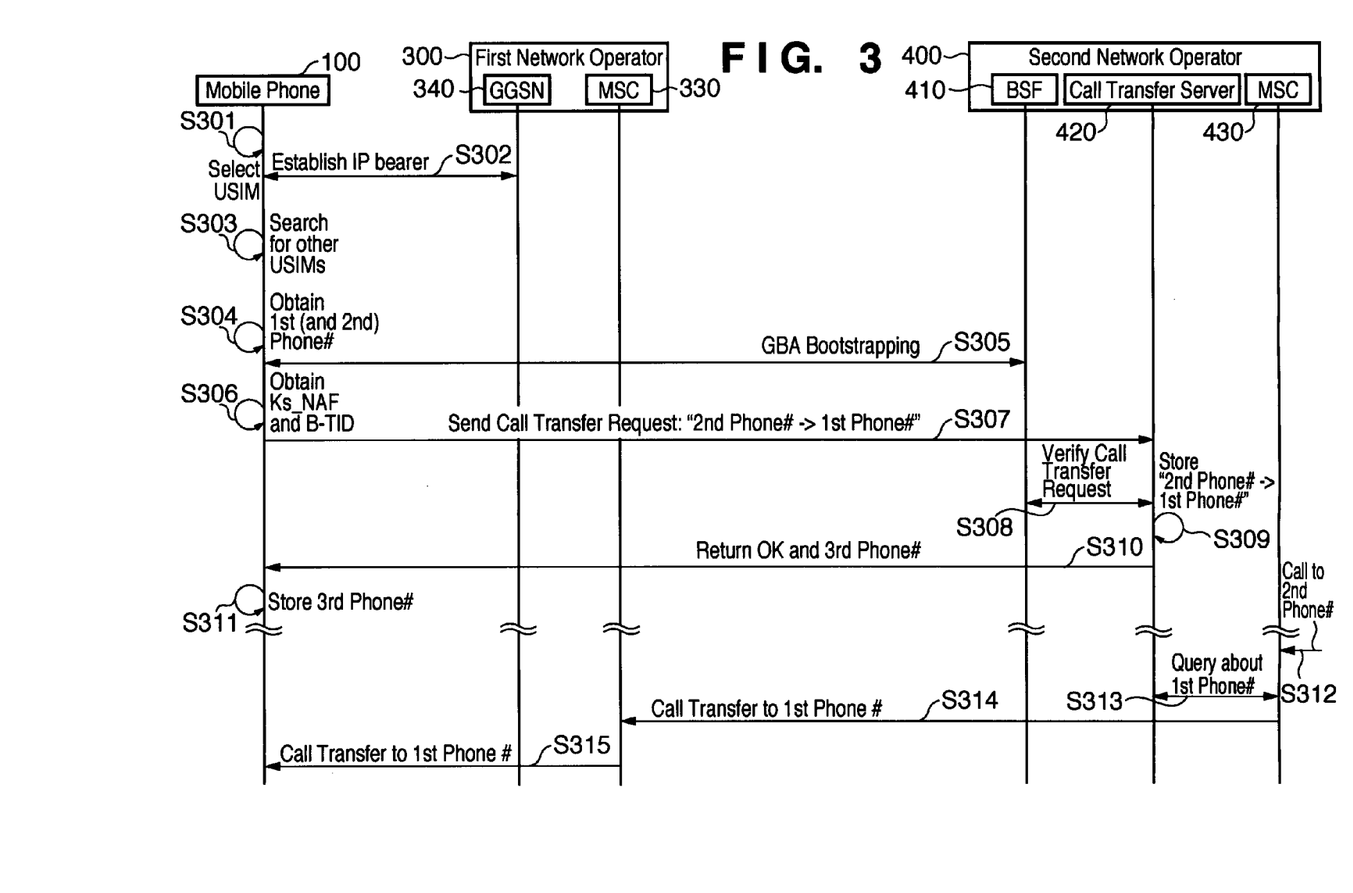
FIG. 3 is a sequence diagram of the configuration procedure of call transfer according to the first embodiment of the present invention.

FIG. 3 is a sequence diagram of the configuration procedure of call transfer according to the first embodiment of the present invention. In the present embodiment, it is assumed that the provisioning function 120 of the mobile phone 100 has stored the first USIM 111 and the second USIM 112 in the UICC 110 before the mobile phone 100 starts the configuration procedure. It is also assumed that the mobile phone 100 attaches a 3GPP network using the first USIM 111 of the first network operator 300, and configures the call transfer service of the second network operator 400 such that a call addressed to the second phone number of the second USIM 112 is transferred to the first phone number of the first USIM 111.

In step S301, the common CS/PS function 130 of the mobile phone 100 selects one of the USIMs stored in the UICC 110 for use in attaching a 3GPP network. In the present embodiment, the first USIM 111 is selected.

In step S302, the common CS/PS function 130 performs GPRS attach and establishes an IP bearer to the GGSN 340 of the first network operator 300 using the first USIM 111.

In step S303, the searching unit 201 searches the UICC 110 for USIMs that are different from the first USIM 111 selected in step S301. In the present embodiment, the second USIM 112 is found.

In step S304, the obtaining unit 202 obtains the first phone number included in the first USIM 111. In some embodiments, the obtaining unit 202 also obtains the second phone number included in the second USIM 112.

In step S305, the bootstrapping unit 204 obtains credentials of the second USIM 112 through the obtaining unit 202, and performs GBA bootstrapping toward the Bootstrapping Server Function (BSF) 410 of the second network operator 400 using the credentials in accordance with the mechanism defined in 3GPP TS 33.220 V7.3.0. Note that the GBA bootstrapping is performed over the IP bearer established in step S302. As a result of the GBA bootstrapping, a Bootstrapping Transaction Identifier (B-TID) is generated and shared between the mobile phone 100 and the BSF 410. It should be noted that although GBA is used to secure the configuration procedure of call transfer in the present embodiment, GBA may be replaced by other mechanisms such as an authentication based on a username/password pair.

In step S306, the obtaining unit 202 obtains, from the second USIM 112, NAF-ID of the call transfer server 420, which acts as a GBA Network Application Function (NAF), of the second network operator 400. In the present embodiment, it is assumed that this NAF-ID is pre-stored in one Elementary File of the second USIM 112. The obtaining unit 202 also obtains Ks_NAF for the call transfer server 420.

In step S307, the sending unit sends, to the call transfer server 420, a call transfer request together with the B-TID and authentication information generated based on the Ks_NAF. The call transfer request specifies the first phone number obtained in step S304 as transfer destination information. Moreover, in the case that the obtaining unit 202 has obtained the second phone number in step S304, the call transfer request specifies the second phone number as transfer source information. Alternatively, in the case that the obtaining unit 202 has not obtained the second phone number in step S304, the call transfer request specifies the B-TID as the transfer source information. Because the call transfer server 420 can identify the second phone number based on the B-TID with support from the BSF 410, whether the transfer source information is the second phone number itself or the B-TID, the call transfer server 420 can identify the second phone number as a transfer source number.

In step S308, the call transfer server 420 obtains, using the received B-TID, the Ks_NAF from the BSF 410 over the standard GBA Zn interface, and verifies the call transfer request based on the Ks_NAF and the received authentication information. In the case that the B-TID is used as the transfer source information, the call transfer server 420 also obtains, using the B-TID, the second phone number from the BSF 410.

In step S309, if the call transfer request has been successfully verified in step S308, the call transfer server 420 stores, in a memory (not shown), call transfer information that associates the second phone number with the first phone number.

Figure 4:
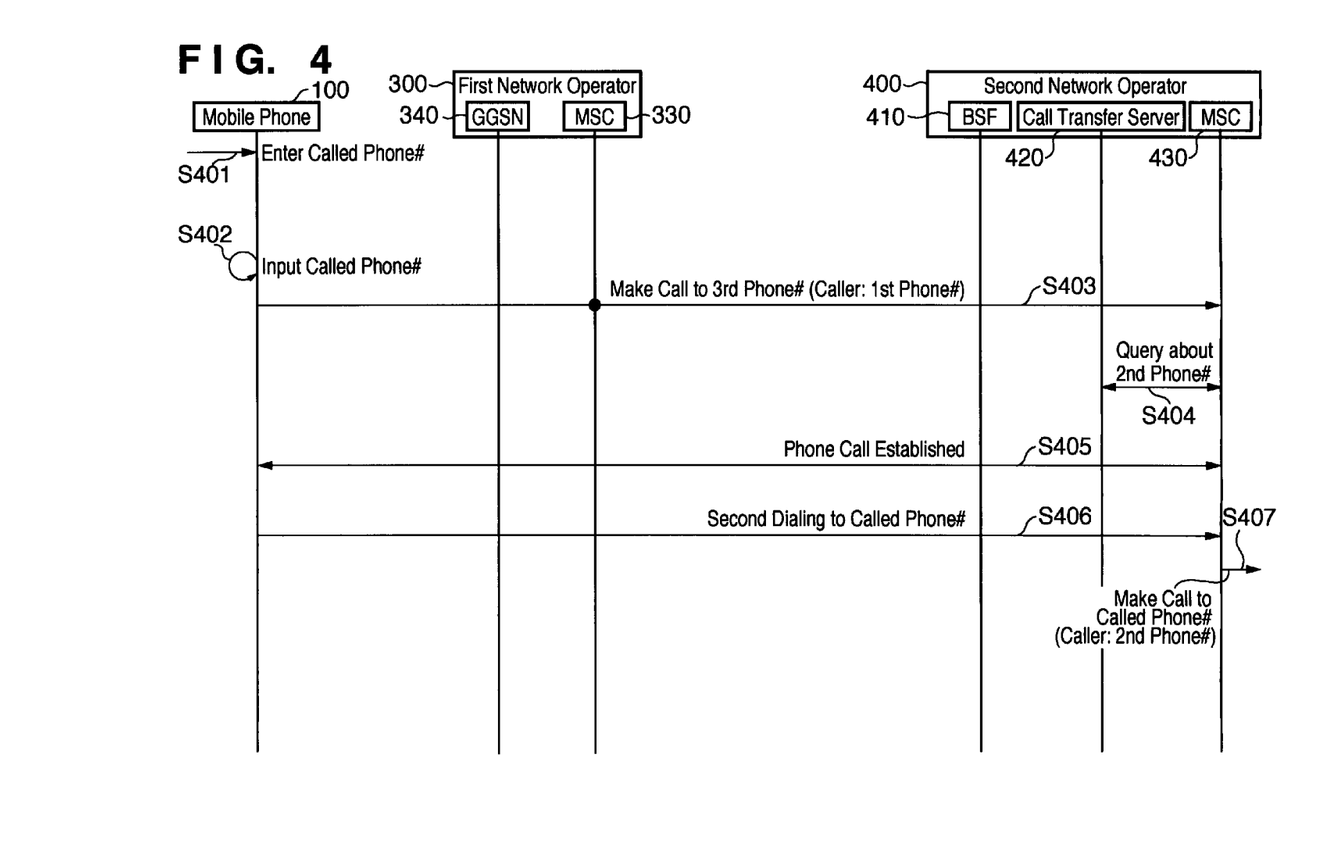
FIG. 4 is a sequence diagram of the second dialing procedure according to the first embodiment of the present invention.

In step S310, the call transfer server 420 returns an OK message together with a third phone number for use in the second dialing procedure of FIG. 4. The third phone number is received by the receiving unit 205 of the mobile phone 100.

In step S311, the receiving unit 205 stores the third phone number in the calling unit 207.

At this point, call transfer has been successfully configured. Accordingly, if the Mobile Service Switching Center (MSC) 430 of the second network operator 400 receives a call addressed to the second phone number of the second USIM 112 later, the call is transferred to the first phone number of the first USIM 111 and received by the mobile phone 100. Specifically, in step S312, the MSC 430 receives the call addressed to the second phone number. In step S313, the MSC 430 queries the call transfer server 420 about the transfer destination number associated with the second phone number, and identifies the first phone number. The MSC 430 transfers the call to the first phone number in step S314, and the call is finally received by the common CS/PS function 130 of the mobile phone 100 via the MSC 330 of the first network operator 300 in step S315.

It should be noted that if a plurality of USIMs that are different from the first USIM 111 are found in step S303, the sending unit 203 may send the call transfer request to respective call transfer servers of respective network operators associated with the found USIMs. In this case, the processing in the other steps is also performed in relation to the respective network operators as needed. For example, the bootstrapping unit 204 performs GBA bootstrapping toward the respective BSFs of the respective network operators in step S305.

FIG. 4 is a sequence diagram of the second dialing procedure according to the first embodiment of the present invention. The second dialing procedure can be performed after the third phone number is stored in step S311 of FIG. 3.

In step S401, the user of the mobile phone 100 decides to make a call, and enters a called phone number through, for example, a keypad (not shown) of the mobile phone 100.

In step S402, the input unit 206 receives the called phone number from the keypad, and inputs the called phone number to the calling unit 207.

In step S403, the calling unit 207, in cooperation with the CS/PS function 130, makes a call to the third phone number, instead of the input called phone number, using the first phone number as a caller phone number. The call is eventually received by the MSC 430 of the second network operator.

In step S404, the MSC 430 queries the call transfer server 420 about a phone number associated with the first phone number in the call transfer information stored in step S309. In the present embodiment, the second phone number of the second USIM 112 is identified.

In step S405, the MSC 430 accepts the call, and therefore, the phone call between the mobile phone 100 and the MSC 430 is established.

In step S406, the calling unit 207, in cooperation with the CS/PS function 130, makes a call (i.e., a second dialing) to the called phone number, which has been input in step S402, via the phone call established in step S405.

In step S407, the MSC 430 makes a call to the called phone number using the second phone number as a caller phone number. Accordingly, even when the mobile phone 100 is using the first USIM 111, the called party can receive a call that uses the second phone number of the second USIM 112 as a caller phone number.

As described above, according to the first embodiment, while the mobile phone 100 is using the first USIM 111 to attach a 3GPP network, the mobile phone 100 configures call transfer such that a call addressed to the second phone number of the second USIM 112 is transferred to the first phone number of the first USIM 111. Specifically, the mobile phone 100 searches for USIMs (e.g., the second USIM 112) that have not been selected, and sends, to the call transfer server 420, a call transfer request for requesting call transfer from the second phone number to the first phone number. Accordingly, the mobile phone 100 can receive a phone call addressed to the second phone number even while the mobile phone 100 is using the first USIM 111. Moreover, the third phone number provided to the mobile phone 100 during the configuration procedure of call transfer enables the mobile phone 100 to make a phone call using the second phone number as a caller phone number even while the mobile phone 100 is using the first USIM 111.

(Second Embodiment)

In the second embodiment, not a mobile phone, but a provisioning server of an RO sends the call transfer request to the call transfer server. Because the provisioning server provides USIMs to the mobile phone, if the provisioning server remembers the provided USIMs and is informed of the USIM selected by the mobile phone, the provisioning server can identify the USIMs that are different from the selected USIMs, and the provisioning server can request call transfer from the phone number of the found USIM to the phone number of the selected USIM on behalf of the mobile phone.

It should be noted that according to the second embodiment, the configuration procedure of call transfer differs from that of the first embodiment. However, according to the second embodiment, the second dialing procedure is performed in a similar way to that of the first embodiment (see FIG. 4).

Figure 5:
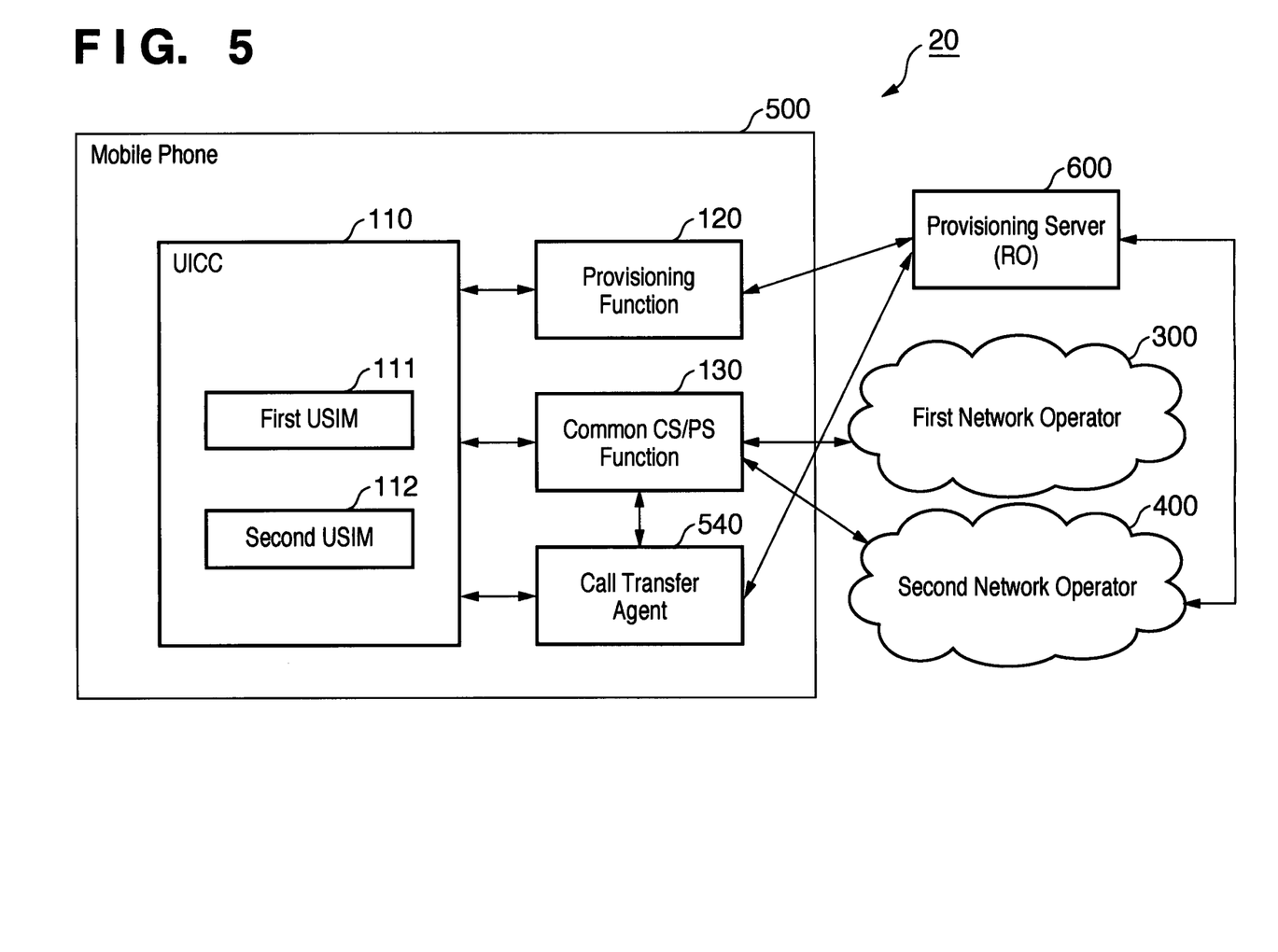
FIG. 5 illustrates an overview of a call transfer system 50 according to the second embodiment of the present invention.

FIG. 5 illustrates an overview of a call transfer system 50 according to the second embodiment of the present invention. When comparing to the call transfer system 10 shown in FIG. 1, The call transfer system 50 comprises a call transfer agent 540 and a provisioning server 600 in place of the call transfer agent 140 and the provisioning server 200.

The call transfer agent 540 performs the configuration procedure of call transfer as detailed later with reference to the sequence diagram of FIG. 8. The call transfer agent 540 also performs the second dialing procedure as detailed previously with reference to the sequence diagram of FIG. 4.

The provisioning server 600 provides the mobile phone 500 with USIMs. Moreover, the provisioning server 600 sends the call transfer request to the second network operator 400.

Figure 6:
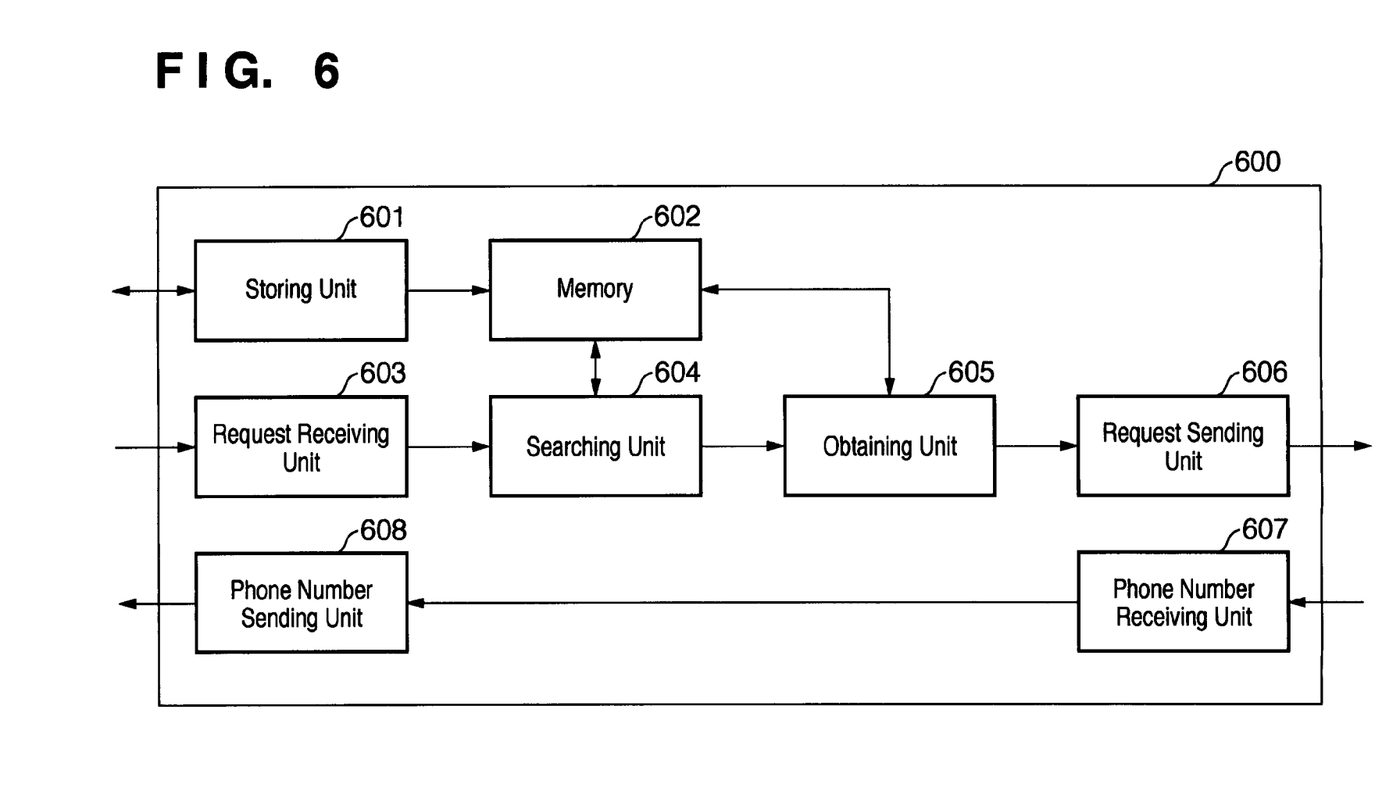
FIG. 6 illustrates a detailed configuration of the mediation server 600.

FIG. 6 illustrates a detailed configuration of the provisioning server 600. The provisioning server 600 comprises a storing unit 601, a memory 602, a request receiving unit 603, a searching unit 604, an obtaining unit 605, a request sending unit 606, a phone number receiving unit 607, and a phone number sending unit 608. It should be noted that the functionality of each block in the provisioning server 600 may be implemented using dedicated hardware, using software executed by a processor (not shown), or a combination thereof. The detailed operations of each block in the provisioning server 600 will be described later with reference to the sequence diagram of FIG. 8.

Figure 7:
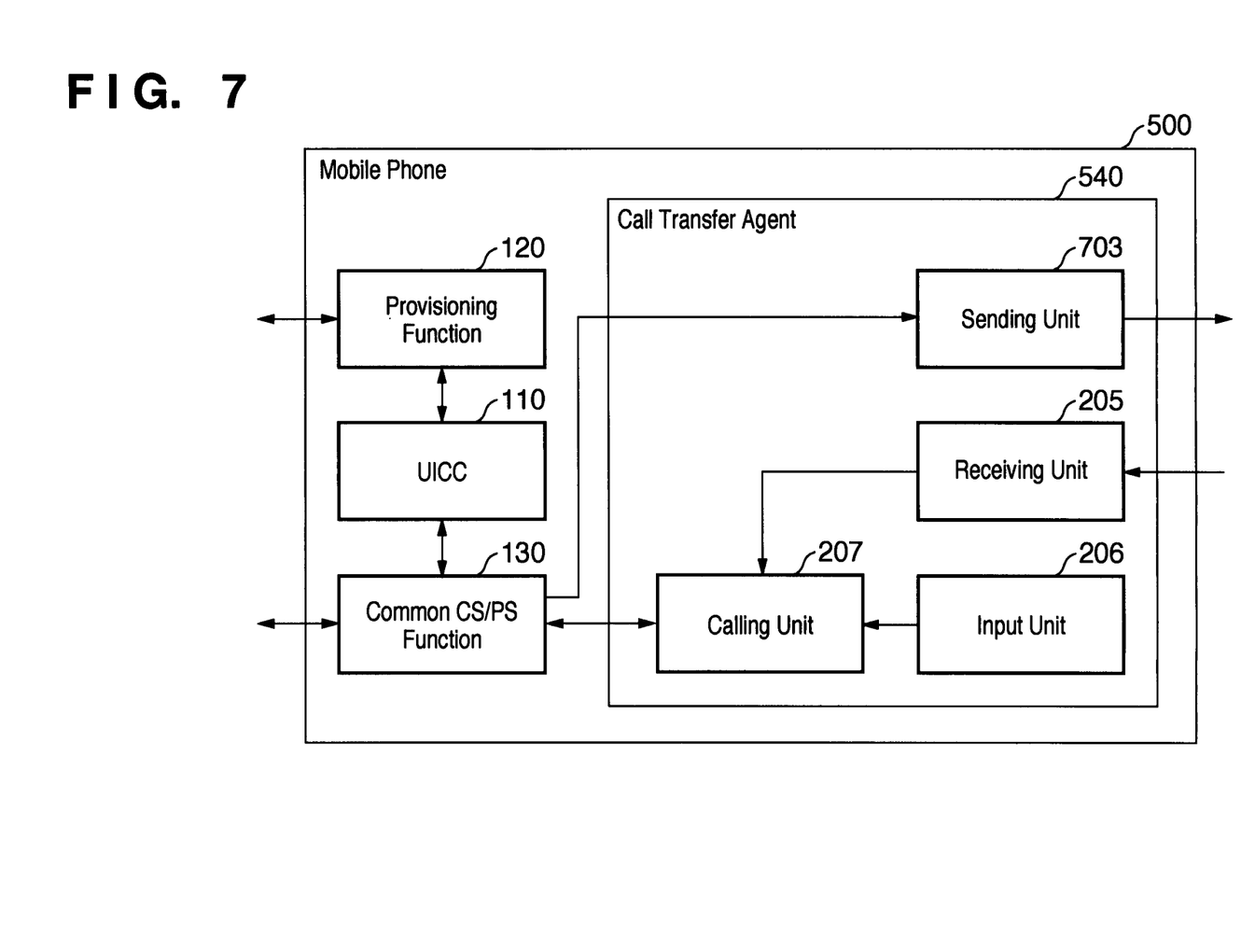
FIG. 7 illustrates a detailed configuration of the call transfer agent 540 of the mobile phone 500.

FIG. 7 illustrates a detailed configuration of the call transfer agent 540 of the mobile phone 500. When comparing to the call transfer agent 140 shown in FIG. 2, the call transfer agent comprises a sending unit 703 in place of the sending unit 203. It should be noted that the functionality of each block in the call transfer agent 540 may be implemented using dedicated hardware, using software executed by a processor (not shown), or a combination thereof. The detailed operations of each block in the call transfer agent 540 will be described later with reference to the sequence diagram of FIG. 8.

Figure 8:
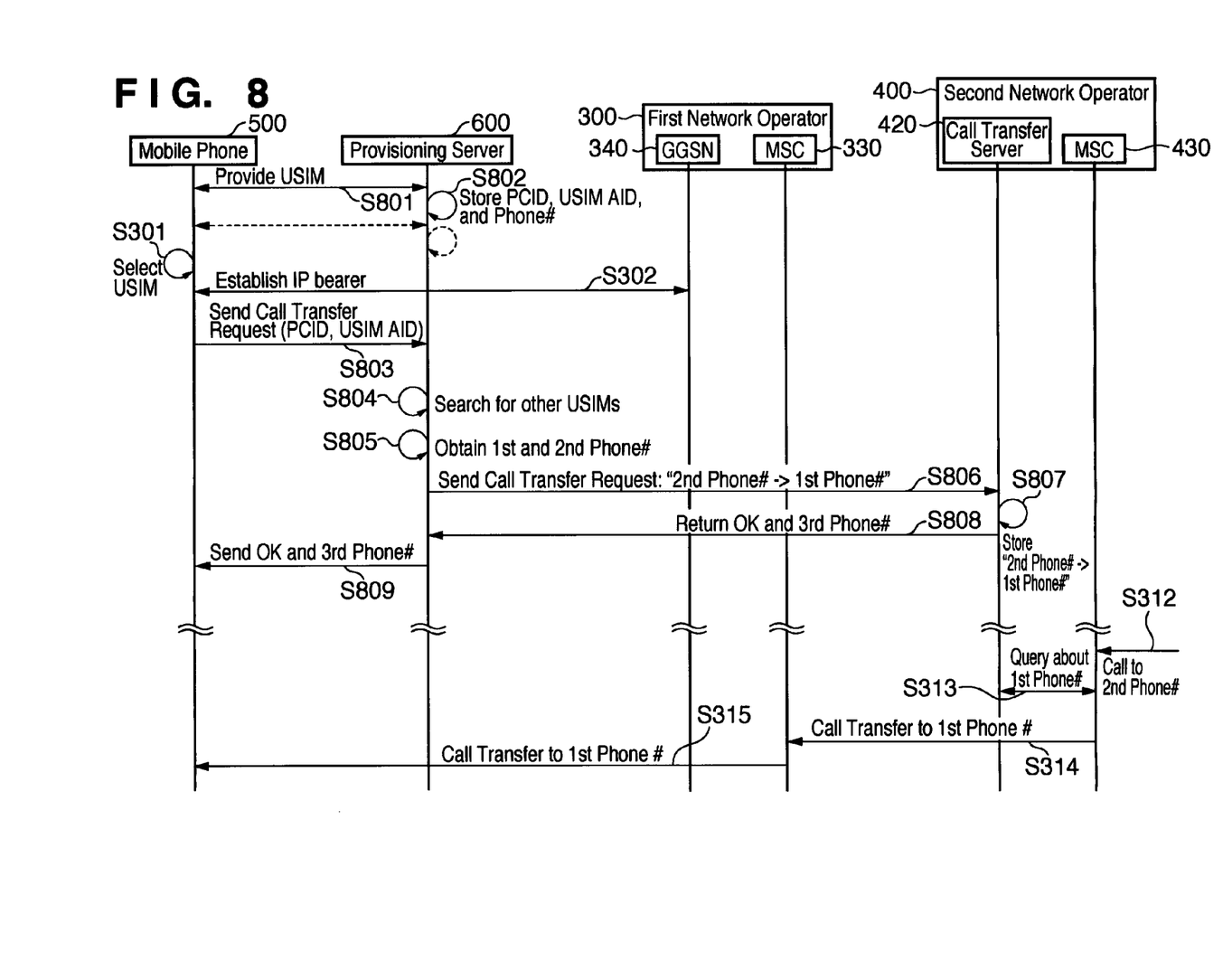
FIG. 8 is a sequence diagram of the configuration procedure of call transfer according to the second embodiment of the present invention.

FIG. 8 is a sequence diagram of the configuration procedure of call transfer according to the second embodiment of the present invention. In FIG. 8, steps in which the same or similar processing to those of FIG. 3 are assigned the same reference numeral, and the description thereof is omitted.

In step S801, upon request from the provisioning function 120 of the mobile phone 500, the storing unit 601 of the provisioning server 600 provides the provisioning function 120 with a USIM. The request includes a PCID, which can be used as device identifier that identifies the mobile phone 500.

In step S802, the storing unit 601 stores, in the memory 602, association information representing association between the PCID, a USIM Application Identity (AID) that identifies the USIM that has been provided to the mobile phone 500 in step S801, and a phone number included in that USIM.

Figure 9:
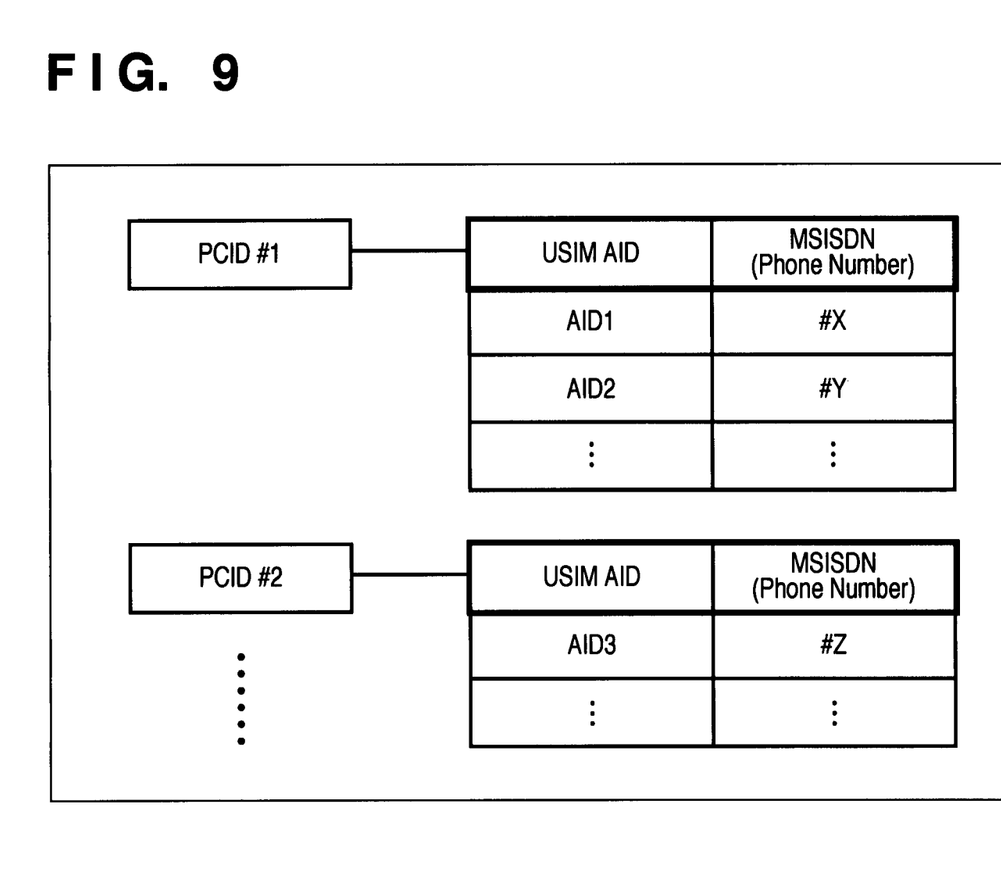
FIG. 9 illustrates an example of the association information stored in the memory 602 of the provisioning server 600.

As described by the dashed arrows following steps S801 and S802, the processing of steps S801 and S802 can be repeated as many times as necessary. As a result, the association information shown in FIG. 9 as an example is stored in the memory 602. In the present embodiment, it is assumed that the processing of steps S801 and S802 are performed twice, and the first USIM 111 and the second USIM 112 are provided to the mobile phone 500.

In step S803, the sending unit 703 of the mobile phone 500 sends a call transfer request to the provisioning server 600. The call transfer request is received by the request receiving unit 603 of the provisioning server 600. The call transfer request includes the PCID of the mobile phone 500 and the USIM AID of the USIM selected in step S301. The USIM AID can be read from DIR Elementary File in the UICC 110.

In step S804, the searching unit 604 of the provisioning server 600 searches the memory 602 for USIM AIDs that are associated with the PCID and that identify USIMs which are different from the selected USIM. In the present embodiment, it is assumed that the first USIM 111 is selected in step S301 and the second USIM 112 is found in step S804.

In step S805, the obtaining unit 605 obtains the first phone number included in the first USIM 111 and the second phone number included in the second USIM 112.

In step S806, the request sending unit 606 sends a call transfer request to the call transfer server 420 of the second network operator 400 associated with the second USIM 112. In the present embodiment, it is assumed that the address of the call transfer server 420 is pre-known by the provisioning server 600. The call transfer request specifies the second phone number obtained in step S805 as transfer source information and also specifies the first phone number obtained in step S805 as transfer destination information.

In step S807, the call transfer server 420 stores, in a memory (not shown), call transfer information that associates the second phone number with the first phone number.

In step S808, the call transfer server 420 returns an OK message together with a third phone number for use in the second dialing procedure of FIG. 4. The third phone number is received by the phone number receiving unit 607 of the provisioning server 600.

In step S809, the phone number sending unit 608 sends, the OK message and the third phone number to the mobile phone 500. The receiving unit 205 of the mobile phone 500 receives the third phone number and stores the third phone number in the calling unit 207.

At this point, call transfer has been successfully configured. Accordingly, if the MSC 430 of the second network operator 400 receives a call addressed to the second phone number of the second USIM 112 later, the call is transferred to the first phone number of the first USIM 111 and received by the mobile phone 500 as noted by steps S312-S315.

Moreover, as mentioned above, the second dialing procedure using the third phone number can be performed in a similar way to that of the first embodiment (see FIG. 4).

It should be noted that if a plurality of USIM AIDs are found in step S804, the request sending unit 606 may send the call transfer request to respective call transfer servers of respective network operators associated with the USIMs identified by the found USIM AIDs. In this case, similarly to the case of the first embodiment, the processing in the other steps is also performed in relation to the respective network operators as needed.

As described above, according to the second embodiment, the mobile phone 500 notifies the provisioning server 600 of the selected USIM (e.g., the first USIM 111) through the USIM AID thereof. The provisioning server 600 remembers the USIMs (e.g., the first USIM 111 and the second USIM 112) provided to the mobile phone 500, and searches for USIMs that are different from the selected USIM. Then, the provisioning server 600 sends, to the call transfer server 420, a call transfer request for requesting call transfer from the second phone number of the second USIM 112 to the first phone number of the first USIM 111. Accordingly, the mobile phone 500 can receive a phone call addressed to the second phone number even while the mobile phone 500 is using the first USIM 111. Moreover, the third phone number provided to the mobile phone 500 during the configuration procedure of call transfer enables the mobile phone 500 to make a phone call using the second phone number as a caller phone number even while the mobile phone 500 is using the first USIM 111.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A telephone that is capable of accessing a memory for storing subscription information that includes a phone number, the telephone comprising:
    a selecting unit that selects one of items of subscription information stored in the memory as first subscription information, the first subscription information being associated with a first network operator and including a first phone number;
    a searching unit that searches the memory for second subscription information that is different from the first subscription information, the second subscription information being associated with a second network operator and including a second phone number;
    a bootstrapping unit that performs, over a communication network of the first network operator, a Generic Bootstrapping Architecture (GBA) bootstrapping procedure toward a Bootstrapping Server Function (BSF) of the second network operator using the second subscription information;
    an obtaining unit that obtains the first phone number included in the first subscription information, authentication information derived based on an identity of a call transfer server of the second network operator and a shared key that has been generated as a result of the GBA bootstrapping procedure, and a Bootstrapping Transaction Identifier (B-TID) that has been generated as a result of the GBA bootstrapping procedure, the call transfer server acting as a GBA Network Application Function (NAF) and the B-TID enabling the call transfer server to identify the second phone number with support from the BSF;

a sending unit that sends a call transfer request, the B-TID, and the authentication information to the call transfer server, the call transfer request being for requesting the second network operator to transfer a call addressed to a phone number, which is identified by the call transfer server based on the B-TID, to the first phone number, wherein the call transfer request is authenticated by the call transfer server based on the authentication information;

a receiving unit that receives a third phone number from the call transfer server as a response to the call transfer request;

an input unit that inputs a called phone number; and a calling unit that makes a call to the third phone number using the first phone number as a caller phone number in response to the input of the called phone number, wherein the calling unit further makes a call to the called phone number via a phone call established as a result of making the call to the third phone number.

2. The telephone according to claim 1, wherein the obtaining unit obtains the second phone number itself as transfer source information.

3. The telephone according to claim 1, wherein in response to the searching unit finding a plurality of items of subscription information each of which is different from the first subscription information, the sending unit sends the call transfer request to respective call transfer servers of respective network operators associated with respective items of the found subscription information.

4. A method for controlling a telephone that is capable of accessing a memory for storing subscription information that includes a phone number, the method comprising:

selecting one of items of subscription information stored in the memory as first subscription information, the first subscription information being associated with a first network operator and including a first phone number;

searching the memory for second subscription information that is different from the first subscription information, the second subscription information being associated with a second network operator and including a second phone number;

performing, over a communication network of the first network operator, a Generic Bootstrapping Architecture (GBA) bootstrapping procedure toward a Bootstrapping Server Function (BSF) of the second network operator using the second subscription information;

obtaining the first phone number included in the first subscription information, authentication information derived based on an identity of a call transfer server of the second network operator and a shared key that has been generated as a result of the GBA bootstrapping procedure, and a Bootstrapping Transaction Identifier (B-TID) that has been generated as a result of the GBA bootstrapping procedure, the call transfer server acting as a GBA Network Application Function (NAF) and the B-TID enabling the call transfer server to identify the second phone number with support from the BSF;

sending a call transfer request, the B-TID, and the authentication information to the call transfer server, the call transfer request being for requesting the second network operator to transfer a call addressed to a phone number, which is identified by the call transfer server based on the B-TID, to the first phone number, wherein the call transfer request is authenticated by the call transfer server based on the authentication;

receiving a third phone number from the call transfer server as a response to the call transfer request;

making a call to the third phone number using the first phone number as a caller phone number in response to input of a called phone number; and making a call to the called phone number via a phone call established as a result of making the call to the third phone number.

5. The method according to claim 4, further comprising:

in response to determining that each of a plurality of items of subscription information is different from the first subscription information, sending the call transfer request to respective call transfer servers of respective network operators associated with respective items of the found subscription information.

* * * * *

UNITED STATES PATENT AND TRADEMARK OFFICE
CERTIFICATE OF CORRECTION

Page 1 of 1

PATENT NO. : 8,964,957 B2
APPLICATION NO. : 13/812662
DATED : February 24, 2015
INVENTOR(S) : Murakami et al.

It is certified that error appears in the above-identified patent and that said Letters Patent is hereby corrected as shown below:

In the Claims

In Column 12, Line 26, in Claim 4, delete "authentication;" and insert -- authentication information; --, therefor.

Signed and Sealed this
Eighteenth Day of August, 2015

Michelle K. Lee
*Director of the United States Patent and Trademark Office*